United States Patent [19]
Dyck

[11] 3,788,344
[45] Jan. 29, 1974

[54] STACKED VALVE SYSTEM

[75] Inventor: Gerhard J. Dyck, Saskatoon, Saskatchewan, Canada

[73] Assignee: Dyckes Sprinkler Co. Ltd., Saskatoon, Saskatchewan, Canada

[22] Filed: July 7, 1972

[21] Appl. No.: 269,739

[30] Foreign Application Priority Data
Aug. 18, 1971 Canada.................................. 120828

[52] U.S. Cl.................................. 137/271, 137/608
[51] Int. Cl. ......................... F17d 1/00, F16k 11/00
[58] Field of Search ........... 137/608, 609, 270, 271; 251/273, 264

[56] References Cited
UNITED STATES PATENTS

| | | | |
|---|---|---|---|
| 3,459,221 | 8/1969 | Axelrod .............................. | 137/608 |
| 2,970,804 | 2/1961 | Busby et al. ..................... | 251/190 X |
| 3,589,387 | 6/1971 | Raymond............................ | 137/271 |
| 2,585,667 | 2/1952 | Meador.............................. | 251/273 X |
| 2,630,292 | 3/1953 | Skweir .............................. | 251/273 X |
| 3,240,230 | 3/1966 | Callahan, Jr. et al............... | 137/608 |
| 3,298,396 | 1/1967 | Gressman et al. ............... | 137/608 X |
| 2,839,265 | 6/1958 | Hobbs.............................. | 251/191 X |
| 3,556,147 | 1/1971 | Sizer et al........................... | 137/608 |

*Primary Examiner*—Samuel Scott
*Attorney, Agent, or Firm*—Craig and Antonelli

[57] ABSTRACT

A stacked valve system is herein provided. It includes a plurality of plastic valve bodies interconnected together. Each plastic valve body includes a central bore, adapted, when a plurality of valve bodies are so interconnected together, to provide a straight throughflow internal valve conduit chamber. A second bore is provided at right angles to the central bore, such second bore extending through the valve body from one face to the diametrically opposed face. The second bore is provided, at one face thereof, with an externally threaded hollow valve barrel, and at the other face thereof with a hollow post. The internal face of the bore at the hollow post is provided with an integrally premolded valve seat. A valve is associated with the valve barrel and the valve includes an internally threaded operator threaded onto the valve barrel. The operator includes a valve stem and a depending valve head adapted to seat on the valve seat. One of the hollow posts serves as an inlet to the flow conduit, while the other posts serve as outlets.

9 Claims, 6 Drawing Figures

STACKED VALVE SYSTEM

BACKGROUND OF THE INVENTION

1. Field of the Invention

This invention relates to improvements in stacked valves. The stacked valve system of aspects of the present invention are all formed of extrusion molded plastics materials.

2. Description of the Prior Art

While rugged valves may be produced from expensive castings of iron, brass, aluminum, etc., it is believed that there are no plastic valves currently commercially available which are designed rugged and practical enough for both general and specific use, e.g., for such things as for house plumbing, for water sprinkler systems or for corrosive liquids, etc. For example, water sprinkler systems connected to house water systems usually require more than one valve. Each valve controls certain portions of the watered area. This is necessary in order to maintain the correct water pressure specified in the sprinkler operations. The current practice is to assemble metal valve assemblies which are either threaded or soldered. They are assembled as one main inlet from the water system of the house and have as many outlets as are necessary for the lawn being watered. Each outlet, of course, requires one valve. This current assembly technique is very tedious and expensive.

In assembled stacked valves of one usual type, it has been the practice to provide separate fastening means between adjacent valves and to provide some sort of flexible or resilient means for maintaining the valves in seated position. In communicating valves of another usual type where it is contemplated that a gauge is to be used to measure pressure or output from a series of connected tanks, the gauge has merely been attached to the valve through a valve-controlled opening. These valves are objectionable in that they have a number of parts to control and to assemble, the parts being liable to failure, are expensive to maintain and are not adapted to have interchangeable parts.

AIMS OF THE INVENTION

An object of one aspect of this invention is to provide an inexpensive valve of simple and rugged design in which the body of the valve may be formed from a plastics material.

An object of another aspect of this invention is to provide stacked valves of such character that they are simple and positive in design and operation and inexpensive to make and maintain.

An object of a further aspect of this invention is to provide stacked valves of such character that they may be readily assembled by a minimum of holding or fastening means.

An object of yet another aspect of this invention is to provide a fluid stacked valve system wherein a series of identical stacked valve bodies may be utilized to build up a manifold-type valve structure which receives fluid from a single source and discharges it to various different selected points of use, the number of such points of use being easily varied or predetermined by an easily accomplished change in the number of stacked valve bodies employed in the system.

An object of still another aspect of this invention is to provide a stacked valve manifold arrangement wherein the stacked valve bodies can be connected together in a compact relation without necessity for any adapters or other similar mounting devices.

An object of a further aspect of this invention is to provide a stacked valve assembly which does not leak at the joints, is easily assembled together, is sturdy after assembly, and is easily mounted in place on a supply duct without extraneous mounting brackets.

An object of a still further aspect of this invention is to provide a stacked valve assembly having the desired features of low cost, usability in confined spaces, satisfactory service life, and one which can be easily manufactured, is very rugged, is non-corrosive, and with minor modifications can be put to many uses.

An object of a general aspect of the present invention is to provide improved plastic stacked valves, valve fixtures and assemblies, which are extremely simple to install, which can be installed with little probability of breakage, which will be efficient in operation and which simultaneously provide a conduit of unhindered throughflow.

Among the uses to which stacked valves of one aspect of this invention may be put is for sprinkler systems.

Another use to which stacked valves of another aspect of this invention may be put include use for handling corrosive liquids, as in potash mines, or use for clinical purposes.

SUMMARY OF THE INVENTION

Broad Statement of the Invention

By a broad aspect of this invention, a valve system is provided which comprises a single plastic valve body or a plurality of plastic valve bodies interconnected together, each plastic valve body including (a) a central bore. Such central bore is adapted, when a plurality of valve bodies are interconnected together, to provide an unhindered straight throughflow internal valve conduit chamber. (b) A second bore, at right angles to the central bore, the second bore extending through the valve body from one face to the diametrically opposed face. The second bore is provided, at one face thereof, with an externally threaded hollow valve barrel, and at the other face thereof is provided with a hollow post. The internal face of the bore at the hollow post is provided with an integrally premolded valve seat. (c) A valve is associated with the valve barrel. Such valve includes an internally threaded operator threaded onto the valve barrel. The operator includes a valve stem and a depending valve head adapted to seat on the valve seat. One of the hollow posts is an inlet to the flow conduit and the other posts can act as outlets.

Variants of the Invention

In one embodiment, the leading face and the trailing face of each plastic valve body are each provided with a semi-torroidal depression, so that an O-ring may be placed in sealing disposition between adjacent valves when assembled and stacked.

In another embodiment, the leading face of each plastic valve body is provided with a hollow stem, and the trailing face is provided with two depressions. The first depression is designed to accommodate an O-ring. The second depression is designed to accommodate a hollow stem. In this way, an O-ring may be placed in sealing disposition around the base of the hollow stem to mate with the first depression. This provides a more positive liquid-tight seal between adjacent valves when they are assembled and stacked.

In either of these embodiments, the external threads on the hollow valve barrel are of the type known as triple square helical threads, and the valve operator, in turn, includes an internally threaded knob having mating triple square helical threads.

Furthermore, in either of the aforementioned embodiments, the valve operator includes a depending valve stem. A depending integral connecting stem of lesser diameter than such valve stem is provided for passage through the central longitudinal bore. This provides minimum resistance to liquid throughflow. A valve head is integrally connected to the connecting stem. Such valve head includes a cylindrical portion, and an angled valve-seating portion.

Also, in any of the above embodiments, the valve-seating portion is fitted with a sealing O-type ring and-/or the valve operator is provided with an O-ring seal in sealing engagement with the valve barrel.

In any of the above embodiments, the leading and trailing valve bodies are provided with sealing end plates held thereon by through bolts and nuts.

By another aspect of this invention, a plastic valve body is provided. The valve body includes a first transverse bore and a second bore, at right angles to such first bore. The second bore extends through the valve body from one face to the diametrically opposed face. The second bore is provided, at an extension of one face thereof, with an externally threaded hollow valve barrel, and at the other face thereof with a hollow post. The internal face of the bore at the hollow post is provided with an integrally premolded valve seat. A valve is associated with the valve barrel, such valve including an internally threaded operator threaded onto the valve barrel. The operator includes a valve stem and a depending valve head adapted to seat on the valve seat. A leading plate is provided for closing the leading face of the valve body across the first bore and a trailing plate is provided for closing the trailing face of the valve body across the first bore. The trailing plate carries an inlet conduit. The hollow post serves as an outlet flow conduit.

DESCRIPTION OF THE DRAWINGS

Brief Description of the Drawings

Figure 1:
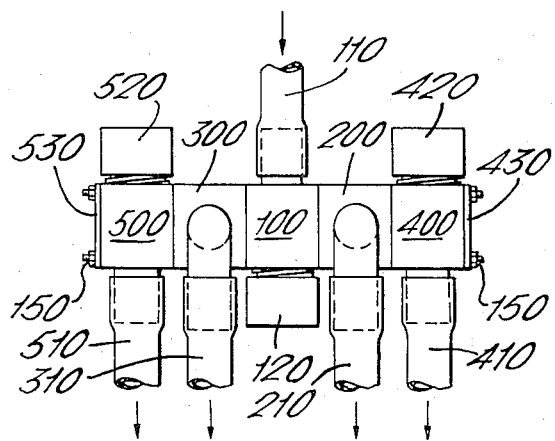
Figure 2:
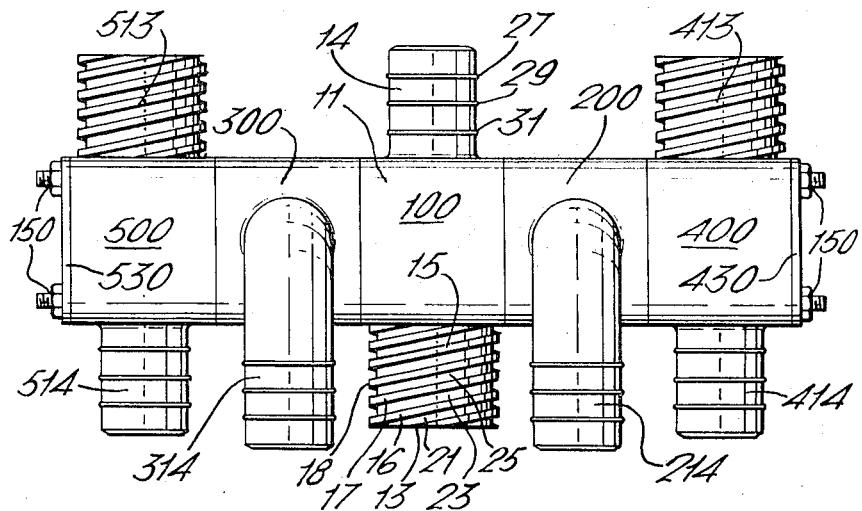
Figure 3:
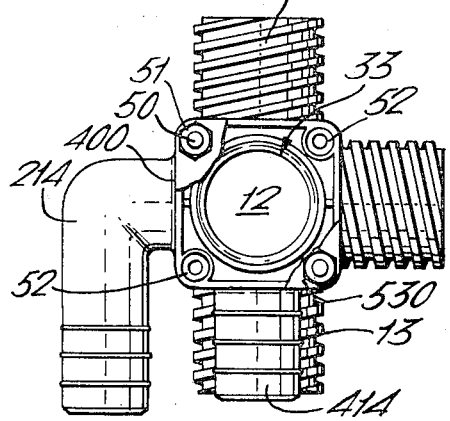
Figure 4:
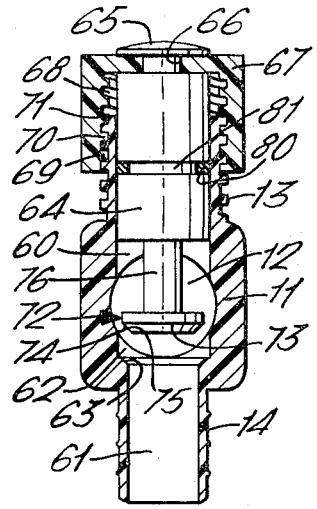
Figure 5:
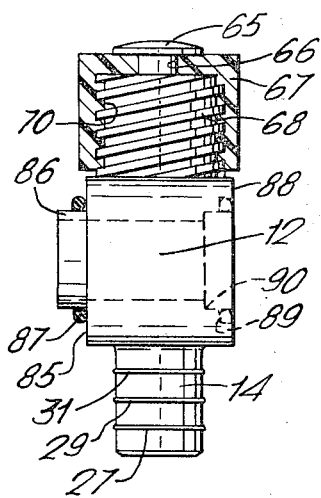
Figure 6:
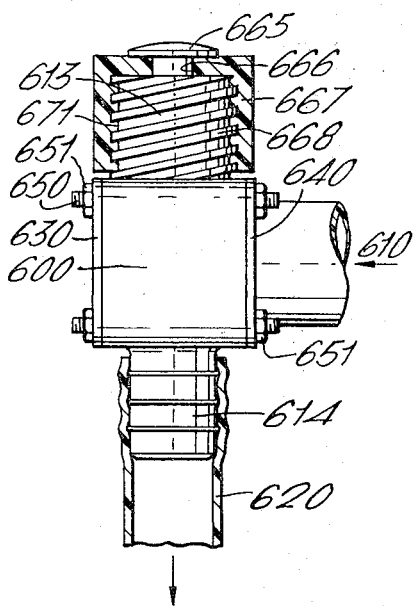

In the accompanying drawings,

FIG. 1 is a general plan view of a stacked valve system of one embodiment of this invention;

FIG. 2 is an enlarged plan view, as in FIG. 1, but without the valve operators and conduit connections;

FIG. 3 is an end view of the embodiment shown in FIG. 2;

FIG. 3 is an end view of the embodiment shwon in FIG. 2;

FIG. 4 is a central longitudinal cross-section through a typical plastic valve of the stacked valve of an embodiment of this invention;

FIG. 5 is a view, particularly in central longitudinal section, of an alternative structure of plastic valve body for use in providing the stacked valve system of an aspect of this invention; and FIG. 6 is a view, partially in central longitudinal section, of a plastic valve body used primarily as a single valve, without a plurality of similar valve bodies in stacked configuration.

SPECIFIC DESCRIPTION OF FIG. 1

As seen in FIG. 1, the stacked valves of one aspect of this invention comprises a plurality (in this embodiment, five) valve bodies 100, 200, 300, 400, 500. Valve body 100 is shown as being the inlet control valve, and so it includes an inlet conduit 110, controlled by a valve operator operated by knob 120. Each of the outlet valve bodies 200, 300, 400, 500 is provided with an outlet conduit 210, 310, 410, 510, respectively, controlled by valve operators operated by knobs (hidden for valve bodies 200 and 300) 420, 520, respectively. End valve bodies 400, 500 are provided with end plates 430, 530, secured conduits 440 and 540, respectively, to the stacked valve. The valve bodies 100, 200, 300, 400, 500 are held together by bolt and nut combinations 150 passing through registering holes in the valve bodies.

SPECIFIC DESCRIPTION OF FIGS. 2 AND 3

Turning now to FIGS. 2 and 3, it is seen that each valve body includes a main body portion 11, provided with a central longitudinal conduit bore 12. Projecting transversely from one face of body portion 11 is a hollow valve barrel 13, communicating with bore 12 in a manner to be described later, and projecting transversely from the opposite face of body portion 11 is a hollow straight projecting stem 14, communicating with bore 12 in a manner to be described later. It is noted that the stem 14 on valve bodies 200 and 300 (namely stems 214 and 314) are shown to be in the form of elbow stems including a 90° bend therein, while the stem 14 on valve bodies 400 and 500 (namely stems 414 and 514) are shown to be straight projecting stems.

Each of valve barrels 13 is externally threaded at 15. While many forms of threads are possible, in some cases, it would be preferred that the threads be triple square helixes 16, 17, 18 with corresponding helical valleys 21, 23, 25 therebetween. This type of thread provides the ample, rugged thread which is desirable for plastic valve construction.

Each stem 14 is provided with gripping means to enable a plastic conduit to be fitted over the stem and to be securely held thereby. As shown, the gripping means comprises one or more spaced-apart, outwardly circumferentially projecting rings, in this case there being three such rings 27, 29, 31.

As seen in FIG. 3, the valve bodies are held together by threaded bolts 50 passing through registering apertures 52, and cooperating nuts 51. Any number of such bolt 50 – nut 51 combinations may be used, even though four such bolt 50 – nut 51 combinations are provided for.

Surrounding the bore 12 within main body portion 11 is a longitudinally extending cylindrical body 33, provided with a longitudinally extending annular depression 34. An O-type sealing ring (not shown) is adapted to be disposed in adjacent depressions 34 when the valve bodies are assembled to provide the stacked valve, in order to provide a water-tight seal between adjacent valve bodies.

SPECIFIC DESCRIPTION OF FIG. 4

The structure of the valve operator is shown in FIG. 4. The main body portion 11 is provided with a longitudinally extending central conduit bore 12. Hollow valve barrel 13 communicates with the bore 12 by means of co-extensive transverse bore 60, while hollow stem 14 communicates with the bore 12 by means of co-extensive transverse bore 61. Transverse bore 61 includes an upper, enlarged valve bore 62, and an inwardly sloping valve seat bore 63 of any suitable angle, e.g., 30°–60° or 45° leading to transverse bore 61.

The valve operator includes a main stem 64, adapted to fit snugly but movably within bore 60. As shown in FIG. 4, an O-ring 80 fitting in a race 81 may be used to provide more positive liquid-tight sealing. The upper end 65 of stem 64 passes through central aperture 66 in knob 67, to fix knob 67 to stem 64. Knob 67 is provided with an internally threaded well 68. Any suitable-type threads may be used, but in this example, the internal threads are triple threads 69, 70, 71 to mate with threads 16, 17, 18 of valve barrel 13.

Depending from stem 64 is a valve head 72, connected to the stem 64 by integral connecting stem 76. Valve head 72 includes a cylindrical portion 73, adapted to seat within enlarged valve bore 62, and a mating seating portion 74, which may, for purposes of providing a more positive seal, be fitted with a sealing O-type ring 75 adapted to seat within valve seat bore 63.

As shown in FIG. 4, the valve is in a partially opened condition.

SPECIFIC DESCRIPTION OF FIG. 5

An alternative structure is shown in FIG. 5, particularly useful for high pressure applications. The leading face 85 of a valve body 11 is provided with a hollow stem 86, and resting at the base of the hollow stem 86 is an O-ring 87. The trailing face 88 of the valve body is provided with a first depression 89 adapted to accommodate the O-ring, and a second depression 90, adapted to accommodate hollow stem 86. Thus, on assembly, hollow stem 86 fits into depression 90, O-ring 87 fits into depression 89, and a positive liquid-tight seal is provided, when the valve bodies are stacked and secured together.

SPECIFIC DESCRIPTION OF FIG. 6

As shown in FIG. 6, the valve bodies may be used singly, and need not be stacked as in the preferred embodiment of this invention. As seen in FIG. 6, the valve body 600 (whose internal structure is as shown in FIG. 4) is provided with a valve operator 667 threaded, by internal thread 671 onto threads 668 on the exterior of a hollow valve barrel 613. An outlet conduit 620 is provided which is secured to conduit 614. One end face of valve body 600 is closed by plate 630 while the other end face is provided with an inlet conduit 610 and a closing plate 640. The plates 630 and 640 are held together by through bolts 650 and nuts 651.

SPECIFIC DESCRIPTION OF ASSEMBLY OF INDIVIDUAL VALVES AS IN FIGS. 1 AND 2

The stacked valve shown in FIG. 1 may be interconnected in such a way as to control the flow of water to different areas for water sprinkling. Valve body 100 includes a main inlet line 110 connected, e.g. to a household water main. Four (or more) valve bodies 200, 300, 400, 500 are connected on either side of the valve 110 with the straight-through bores 12 being interconnected to provide an unrestricted internal valve conduit. The knobs 120–520 (only 120, 420 and 520 being seen in FIG. 1) connected to the valve bodies 100 – 500 respectively are rotated to adjust the respective valves 100 – 500 so that the requisite amount of water at the requisite pressure flows out of the outlet lines 210 – 510. Outlet lines 210, 310 would feed two underground sprinkler systems. The end plates 430, 530 may be metal or plastic.

The stacked valve is thus assembled from similar valve bodies in such a manner that the valve bodies can be assembled by the simple technique of fitting them over the through bolts 150 and tightening the through bolt on as many valve bodies as required using the nuts 51.

GENERAL NATURE OF THE INVENTION

The threaded valve assembly provides the main source of strength and is one of the main features of this design. Because the thread is molded in the main body, the diameter can be any size necessary to withstand the shear strength of the plastics material. For maximum strength, the thread may be of the types known as buttress, acme, or square thread.

This ganged valve is extremely functional in that the through bolts tie together the assembly sealing the O-type ring between adjacent valve bodies. The valve bodies are relatively easy to produce by injection molding and having the advantages of plastic valves, including corrosion resistance, etc.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and "intended" to be, within the full range of equivalence of the following claims.

I claim:
1. A valve comprising:
  a. a plastic valve body including
    i. a longitudinally extending main body having longitudinally spaced apart ends thereof, each end adapted to engage abuttingly with an end of a similar valve when aligned longitudinally therewith;
    ii. an externally threaded valve barrel integral with and projecting transversely from one side of said main body;
    iii. a post integral with and projecting transversely from an opposite side of said main body and aligned with said valve barrel;
    iv. a first bore extending longitudinally through said main body and positioned so as to be longitudinally aligned with the first bore of a similar valve body when respective ends of the two valve bodies are longitudinally aligned and in abutting engagement;
    v. a second bore extending transversely through said valve barrel, said main body and said post and intersecting said first bore; and
    vi. a valve seat in said second bore intermediate said first bore and said post;
  b. an internally threaded valve operator threaded onto said valve barrel;
  c. a valve stem disposed coaxially within said second bore and mounted on said operator, said stem including i. a main stem portion adjacent said valve operator and dimensioned to be a sliding fit within said second bore; and ii. a connecting stem portion extending from an end of said main stem portion remote from said operator and having a diameter less than the diameter of said main stem portion and less than the diameter of said first bore; and d. a valve head engageable with said valve seat and mounted on the free end of said connecting stem portion of said valve stem, said head being dimensioned to be a sliding fit within said second bore intermediate the valve seat and the first bore.

2. A valve as claimed in claim 1 and further including a first plate secured to said main body and closing an end of said first bore, a second plate secured to said main body and having an aperture therethrough in communication with an opposite end of said first bore, and a conduit secured to said second plate such that said first bore communicates in fluid-flow relation with the interior of said conduit through said aperture.

3. The invention of claim 1 wherein the external surface of said main body has a pair of annular recesses formed therein, said recesses disposed about the respective opposite ends of said first bore whereby an annular seal member may be disposed in the recesses of two adjacent and interconnected valves.

4. The invention of claim 1 wherein said valve body includes: a hollow stem integral with, and projecting from, said main body and aligned with the first bore through said main body whereby the interior of said hollow stem communicates in fluid-flow relationship with one end of said first bore; an annular recess in the external surface of said main body disposed about the opposite end of said bore and adapted to receive an annular seal member; and a cylindrical recess in said main body disposed between said annular recess and said first bore and adapted to receive the hollow stem of an adjacent valve.

5. The invention claimed in claim 1 wherein the external threads on said hollow valve barrel comprise triple square helical threads and wherein the valve operator comprises an internally threaded knob having mating triple square helical threads.

6. The invention as claimed in claim 1 wherein said valve head includes a seating portion and an annular seal mounted on said seating portion.

7. The invention as claimed in claim 1 wherein said valve stem comprises: a main stem portion adjacent said valve operator and a connecting stem portion intermediate said main stem portion and said valve head, said main stem portion being shaped and dimensioned to be a sliding fit within said second bore and having an annular peripheral recess therein, and an annular seal member disposed within said recess and engaging said second bore in a sealing manner.

8. A stacked valve system comprising a plurality of interconnected valves, each valve comprising:

a. a plastic valve body including i. a longitudinally extending main body having longitudinally extending spaced apart ends thereof, each end adapted to engage abuttingly with the adjacent end of an adjacent one of said valves, at least one of said ends being so engaged;

ii. an externally threaded valve barrel integral with, and projecting transversely from, one side of said main body;

iii. a post integral with, and projecting transversely from, an opposite side of said main body and aligned with said valve barrel;

iv. a first bore extending longitudinally through said main body and communicating in end-to-end relationship with the first bore of each adjacent valve;

v. a second bore extending transversely through said valve barrel, said main body and said post and intersecting said first bore; and vi. a valve seat in said second bore intermediate said first bore and said post;

b. an internally threaded valve operator threaded onto said valve barrel;

c. a valve stem disposed coaxially within said second bore and mounted on said operator, said stem including:

i. a main stem portion adjacent said valve operator and dimensioned to be a sliding fit within said second bore; and ii. a connecting stem portion extending from an end of said main stem portion remote from said operator and having a diameter less than the diameter of said main stem portion and less than the diameter of said first bore; and d. a valve head engageable with said valve seat and mounted on the free end of said connecting stem portion of said valve stem;

said system further comprising connector means extending longitudinally through all of said valve bodies so as to maintain said valve bodies in longitudinally aligned abutting engagement.

9. The stacked valve system of claim 8 wherein said plurality of valves includes at least a leading valve and a trailing valve, each secured only to one other valve of said plurality of valves, said system further comprising a pair of end plates one of which is secured to a face of the leading valve to close the open end of the first bore thereof, and the other of which is secured to a face of the trailing valve to close the open end of the first bore of the trailing valve.

* * * * *